United States Patent Office 2,798,052
Patented July 2, 1957

2,798,052

MANUFACTURE OF POLYMERS BY PYROLYSIS OF 1,4-DIMETHYL ARYL COMPOUNDS

Alec Norman Roper, Eccles, Manchester, England, assignor, by mesne assignments, to The M. W. Kellogg Company, Jersey City, N. J., a corporation of Delaware No Drawing. Application January 29, 1954,
Serial No. 407,164

18 Claims. (Cl. 260—2)

The manufacture of solid polymers which have high heat stability, high resistance to acids and high resistance to organic solvents by the vapour phase pyrolysis of 1,4-dimethyl aryl compounds and subsequent cooling of the resulting vapours to a temperature at which a solid polymer is deposited is described in British Patents Nos. 650,947 and 673,651 and in pending United States patent applications Serial No. 48,339 filed on September 8, 1948, Serial No. 141,599 filed on January 31, 1950, Serial No. 306,938 filed on August 28, 1952, Serial No. 306,939 filed on August 28, 1952, and Serial No. 306,940 filed on August 28, 1952.

The 1,4-dimethyl aryl compounds which may be used as starting materials in the manufacture of the solid polymers are para-xylene, 1,4-dimethyl naphthalene and nuclear-substituted derivatives of these compounds substituted in the nucleus by one or more methyl groups and/or atoms of the normally gaseous halogens, viz. chlorine and fluorine.

The processes for the production of the solid polymers which are disclosed in the patents and patent applications referred to above generally comprise pyrolyzing the starting material in the vapour state by subjecting the vapour at subatmospheric pressure to a temperature between 700 and 1000° C. for not more than 1 second and cooling the resulting vapours to a temperature at which a solid polymer is deposited.

The pyrolysis step of the process results in the formation in the vapour phase of the 1,4-dimethylene aryl compound obtained by the splitting off of two hydrogen atoms from the starting material and it is this dimethylene compound which polymerises on cooling and condensation to form the desired end product. However, at the temperatures employed cracking or decomposition of the starting material beyond the stage at which two hydrogen atoms split off, also takes place, and it is naturally desirable that such excessive cracking should be kept to a minimum in order to obtain good overall yields.

It has hitherto been considered necessary to conduct the pyrolysis at temperatures below 1000° C. in order to keep the excessive cracking within bounds and to obtain the desired solid polymer.

It has now been found that contrary to previous expectations, the solid polymers can be obtained and in much enhanced yield at temperatures above 1000° C. if the contact time is suitably shortened and is kept below 0.1 second. Not only can the conversion per pass to the desired end product be greatly increased under these conditions, but the loss of starting material per pass is considerably reduced. These advantages may be obtained at temperatures up to about 1300° C., provided the time of heating is kept suitably short.

The invention thus consists in a process for the production of solid polymers, which comprises pyrolyzing the vapours of one or more 1,4-dimethyl aryl compounds selected from the group consisting of para-xylene, 1,4-dimethyl naphthalene and nuclear substituted derivatives of these compounds which are substituted in the nucleus by one or more methyl groups and/or atoms of the normally gaseous halogens, by subjecting the said vapours at sub-atmospheric pressure to a temperature above 1000° C. and not substantially exceeding 1300° C. for a time not exceeding 0.10 second and cooling the resulting vapours to a temperature at which a solid polymer is deposited.

The preferred temperature range for the pyrolysis step is from 1020 to 1150° C. The heating time preferably does not exceed 0.05 second.

The process of the invention may most advantageously be applied to the production of solid polymers from para-xylene which is least prone to excessive decomposition at the high temperatures employed.

Thus a particularly valuable form of the invention consists in a process for the production of solid polymers, which comprises pyrolyzing the vapour of para-xylene by subjecting the said vapour at sub-atmospheric pressure to a temperature above 1000° C. but not substantially exceeding 1300° C. for a time not exceeding 0.10 second and cooling the resulting vapours to a temperature at which a solid polymer is deposited. Preferably the pyrolysis is conducted at a temperature between about 1020° C. and about 1150° C. and with a heating time between about 0.05 second and about 0.01 second.

The process of the invention may also be applied to other 1,4-dimethyl aryl compounds falling within the group specified and particularly to 1,4-dimethyl naphthalene and the nuclear substituted derivatives of para-xylene containing up to two additional methyl substituents or up to two chlorine or fluorine atoms. Thus it may be applied to pseudocumene, durene, isodurene, 2-fluoro-p-xylene, 2-chloro-p-xylene, 2,5-dichloro-p-xylene and 2,5-difluoro-p-xylene. It may also be applied to mixtures of para-xylene and any of these compounds.

Starting materials containing nuclearly substituted fluorine atoms may be prepared by introducing the fluorine atoms into the aromatic nucleus, one at a time by the method of Balz and Schiemann, described in "Organic Reactions" volume 4, chapter 5, pages 194–216. Those containing nuclearly substituted chlorine atoms may be prepared by introducing the chlorine atoms, one at a time, into the aromatic nucleus by the well-known Sandmeyer reaction, as described in "Organic Synthesis," collective volume 1, p. 170.

When methyl or halogen substituted para-xylenes are used as starting materials, it will generally be found necessary to use lower temperatures and/or contact times, and preferably also lower pressures, in the pyrolysis step than those which may suitably be employed for para-xylene in order to minimise losses of the starting material.

The heating or contact time of the pyrolysis step of the process of the invention for any given starting material depends largely on the temperature of pyrolysis. Generally speaking, the higher the temperature, the shorter is the contact time required to obtain optimum results.

The heating or contact time as used herein is the residence time of the vapour in the pyrolysis zone and is normally determined by dividing the length of the pyrolysis tube forming the pyrolysis zone by the linear velocity of the vapours passing therethrough.

To avoid excessive decomposition or cracking leading to an excessive loss of starting material, it is necessary that the pyrolysis be conducted at sub-atmospheric pressure and preferably at a pressure not substantially exceeding 400 mms. Hg absolute. The pyrolysis may be conducted in the presence of an inert gas or vapour such as carbon dioxide, nitrogen or steam and in such a case the total pressure should preferably not substantially exceed 400 mms. Hg absolute and the partial pressure of the vapour of the aromatic starting material should preferably not substantially exceed 100 mms. Hg pressure. More preferably the total pressure should not substantially exceed 200 mms. Hg absolute. Most satisfactory results are obtained when using undiluted vapour of the aromatic starting material at pressures of about 10 mms. Hg and below. When the vapour of the aromatic starting material is diluted with an inert gas or vapour, the most satisfactory results are obtained at a partial pressure of the vapour of the aromatic starting material of about 10 mms. Hg absolute and below and at a total pressure not substantially exceeding 100 mms. Hg absolute.

The substantial advantages obtained by the process of the invention are illustrated by the following results. By choosing the conditions for the pyrolysis of undiluted para-xylene vapour, so that the temperature is between 1020 and 1150° C., the heating time is between 0.05 and 0.01 second and the pressure of the vapour is below 10 mms. Hg absolute, conversions of from 23 to 30% by weight to the desired end product may easily be obtained per pass with a loss of para-xylene of less than 10% by weight per pass. Operating under the most favourable conditions at temperatures below 1000° C. a conversion of about 15% by weight is obtained per pass and the loss per pass is about 25% by weight.

The polymers produced by the process of the invention are formed spontaneously on cooling the pyrolyzed vapours. The optimum cooling temperature can easily be determined by experiment. It depends on the partial pressure on the monomer vapour in the gas phase and increases with increasing partial vapour pressure. Cooling to from 0 to 50° C. and preferably to room temperature will, however, generally be found most satisfactory for this purpose in the processes of the invention, though on occasion it may be found advantageous to cool down to —80° C.

The polymers may be recovered in film form by cooling in contact with a cold surface and may be washed with benzene, ether or other suitable solvent to remove condensed starting material or other soluble material present. After formation the films may be stripped from the surface on which they have been deposited to form coherent, self-supporting films. The polymers may also be recovered in the form of flakes by the use of steam as described in pending application Serial No. 306,939 filed August 28, 1952. Furthermore the polymer may be recovered in finely divided form by chilling the pyrolyzed vapours with a spray of non-solvent, e. g. ethylene glycol.

The polymer produced by the invention have many valuable uses as they have relatively high thermal stabilities, do not dissolve in the usual organic solvents at normal temperatures, are generally resistant to concentrated mineral acids at normal temperatures and have good electrical insulating properties. Thus they may be used whenever these properties are required as in protective coatings and in electrical element insulation.

In most cases, the polymers produced by the process of the invention consist of at least 100 monomeric units and have the desirable characteristics associated with high molecular weight polymers. They have relatively high softening points which are well above 200° C. The polymer from para-xylene, for example, softens at nearly 400° C. The polymers are furthermore insoluble in low boiling organic solvents. They are, however, soluble at elevated temperatures in high boiling aromatic solvents such as diphenyl, benzyl benzoate, phenanthrene and polycyclic aromatic fractions obtained from the distillation of coal tar products and petroleum cracking. Thus the polymer obtained from para-xylene is soluble in such solvents at temperatures in the region of 250 to 300° C. and above.

The polymers produced by the process of the invention will also resist attack by cold, concentrated hydrochloric, nitric or sulphuric acid and by hot concentrated hydrochloric acid.

Polymers obtained from isodurene and pseudocumene or from mixtures of these compounds with para-xylene can be moulded at a temperature of about 300 to 320° C. under a pressure of ½ ton/sq. inch to give flexible products. The polymer obtained from para-xylene is difficult to mould and yields a brittle product. It may, however, be suitably used in comminuted form as a filler for compositions in which its properties are valuable and may also be directly deposited as a coating in film form.

Following are examples of the process of the invention. All percentages are percentages by weight.

*Example 1* p-Xylene vapour at a pressure of 2.5 mm. Hg was passed through a silica tube heated to 1,020° C. at such a rate that the vapour was subjected to this temperature for 0.05 second. The vapour leaving the tube was passed into a trap in which it was cooled to approximately 18° C. in contact with a cold surface on which a polymeric product was deposited in the form of yellowish-white, coherent film. Unconverted p-xylene was condensed in a further trap cooled to —80° C. The film was washed with benzene to remove any condensed soluble material.

The percentage conversion per pass was found to be 23% and the loss of p-xylene per pass was found to be from 7 to 8%. The overall yield obtainable with recycling is about 60%.

*Example 2*

Example 1 was repeated with a temperature of pyrolysis of 1,090° C. and a contact time of 0.03 second. The conversion per pass of p-xylene to polymer was found to be 28.5% and the loss of p-xylene per pass was found to be 8%.

*Example 3*

Example 1 was repeated with a pyrolysis temperature of 1,120° C. and a contact time of 0.02 second.

The conversion per pass was found to be 31% and the loss of p-xylene per pass was found to be 7.5%.

*Example 4*

A mixture of steam and p-xylene vapour in the molar ratio of 100:1 was passed at a pressure of 150 mm. Hg through a reaction tube, the temperature of the mixture in the tube being 1,100° C. The rate of passage through the tube was such that the mixture was subjected to the temperature of 1,100° C. for 0.03 second. The vapours leaving the tube were cooled to room temperature. A spongy mass was deposited which was washed with benzene and dried to recover the polymer in the form of flakes.

I claim:

1. In the manufacture of solid polymers which have high heat stability, high resistance to acids and high resistance to organic solvents, the process which comprises pyrolyzing the vapours of at least one 1,4-dimethyl aryl compound selected from the group consisting of para-xylene, 1,4-dimethyl naphthalene and nuclear-substituted derivatives of these compounds which are substituted in the nucleus by at least one substituent selected from the group consisting of methyl groups and the atoms of normally gaseous halogens, by heating the said vapours at sub-atmospheric pressure to a temperature above 1000° C. but not substantially exceeding 1300° C. for a time not exceeding 0.1 second, followed by cooling the resulting vapours to a temperature at which a solid polymer is deposited.

2. The process of claim 1, in which the vapours of para-xylene are pyrolyzed.

3. The process of claim 1, in which a mixture of the vapours of para-xylene and of a nuclear-substituted methyl derivative thereof containing a total of up to 4 methyl groups is pyrolyzed.

4. The process of claim 1, in which the said temperature is from 1020 to 1150° C. and the heating time does not exceed 0.05 second.

5. The process of claim 1, in which the pyrolysis is conducted with the vapours of the aryl compound diluted with an inert gas or vapour.

6. The process of claim 5, in which the inert gas or vapour is steam.

7. The process of claim 1, in which the said vapours are pyrolyzed at a partial pressure not substantially exceeding 100 mms. Hg absolute and at a total pressure not substantially exceeding 400 mms. Hg absolute.

8. The process of claim 1, in which the said vapours are pyrolyzed at a partial pressure not exceeding 10 mms. Hg absolute and at a total pressure not exceeding 100 mms. Hg absolute.

9. The process of claim 1, in which the resulting vapours are cooled to a temperature below 50° C. for deposition of the polymer.

10. In the manufacture of solid polymers which have high heat stability, high resistance to acids and high resistance to organic solvents, the process which comprises pyrolyzing the vapour of para-xylene by heating the vapour at sub-atmospheric pressure to a temperature over 1000° C. but not substantially exceeding 1300° C. for a time not exceeding 0.05 second and cooling the resulting vapours to a temperature at which a solid polymer is deposited.

11. The process of claim 10, in which the vapour is pyrolyzed by being heated to a temperature of from 1020 to 1150° C. for from 0.05 to 0.01 second.

12. The process of claim 10, in which the pyrolysis is conducted with the vapour at a partial pressure not exceeding 100 mms. Hg absolute and at a total pressure not exceeding 400 mms. Hg absolute.

13. The process of claim 12, in which the partial pressure does not exceed 10 mms. Hg absolute and the total pressure does not exceed 100 mms. Hg absolute.

14. In the manufacture of solid polymers which have high heat stability, high resistance to acids and high resistance to organic solvents, the process which comprises pyrolyzing the vapour of para-xylene by heating the vapour at a partial pressure not substantially exceeding 10 mms. Hg absolute and at a total pressure not substantially exceeding 100 mms. Hg absolute to a temperature of from 1020 to 1150° C. for a time of from 0.05 to 0.01 second and cooling the resulting vapours to a temperature at which a solid polymer is deposited.

15. The process of claim 10, in which the pyrolysis is conducted with the vapour of para-xylene diluted with an inert gas or vapour.

16. The process of claim 14, in which the pyrolysis is conducted with the vapour of para-xylene diluted with steam.

17. The process of claim 10, in which the resulting vapours are cooled to a temperature ranging from about room temperature to about −80° C. for deposition of the polymer.

18. The process of claim 14, in which the resulting vapours are cooled to a temperature ranging from about room temperature to about −80° C. for deposition of the polymer.

References Cited in the file of this patent

FOREIGN PATENTS 650,947  Great Britain _____ Mar. 7, 1951

OTHER REFERENCES

Getman and Daniels: "Outlines of Theoretical Chemistry," 6th ed., pages 332, 333, Wiley & Sons (1937).